United States Patent [19]

Shiska

[11] Patent Number: 5,635,817
[45] Date of Patent: Jun. 3, 1997

[54] VEHICLE BATTERY CHARGING SYSTEM

[76] Inventor: Theodore Shiska, 26 Shiska La., Clinton, Pa. 15026

[21] Appl. No.: 429,423

[22] Filed: Apr. 24, 1995

[51] Int. Cl.$^6$ ...................................................... H01R 3/00
[52] U.S. Cl. ...................... 320/25; 320/2; 439/500
[58] Field of Search .............................. 320/2, 25, 48; 439/500

[56] References Cited

U.S. PATENT DOCUMENTS

| | | | |
|---|---|---|---|
| 3,590,357 | 6/1971 | Reid | 320/7 |
| 3,806,790 | 4/1974 | Marshall | 320/15 |
| 4,157,492 | 6/1979 | Colbrese | 320/25 |
| 4,258,305 | 3/1981 | Anglin | 320/2 |
| 4,617,506 | 10/1986 | Bogie et al. | 320/2 |
| 4,746,853 | 5/1988 | Ingalls | 320/25 |
| 4,757,250 | 7/1988 | Guim et al. | 320/25 |
| 4,769,586 | 9/1988 | Kazmierowicz | 320/26 |
| 4,829,223 | 5/1989 | Broberg et al. | 320/2 |
| 4,831,321 | 5/1989 | Cooper | 320/25 |
| 4,885,524 | 12/1989 | Wilburn | 320/25 |
| 5,194,799 | 3/1993 | Tomantchger | 320/2 |
| 5,214,368 | 5/1993 | Wells | 320/2 |
| 5,254,927 | 10/1993 | Chuang | 320/2 |
| 5,343,135 | 8/1994 | Mathieson | 320/2 |
| 5,367,243 | 11/1994 | Wells et al. | 320/2 |

*Primary Examiner*—Robert Nappi
*Attorney, Agent, or Firm*—James L. Sherman

[57] ABSTRACT

An emergency vehicle battery charging device is utilized to charge a depleted battery of a first vehicle from the engine system of a running second vehicle at a predetermined maximum charging current above that used for a trickle charge and below the typical starting current of either vehicle. The battery charging device includes a control housing having a first pair of cables extending therefrom which is rigidly connected to the battery terminals of one of the vehicles and a second pair of cables extending therefrom for being selectively connected to the battery terminals of the other of the vehicles. The cables include a current limiting device to prevent any exceeding of the predetermined maximum charging current which is preferably within a range of about 40 to 60 amps. The control housing includes a polarity detecting device to verify the correct polarity of the connection of the terminals of the two batteries and to electrically disconnect the two batteries of there was an incorrect polarity. When using the emergency vehicle battery charging device, the dead battery of a first vehicle, which is not started or running, should be charged through the engine system of the second vehicle, which is running, in about three to five minutes.

18 Claims, 2 Drawing Sheets

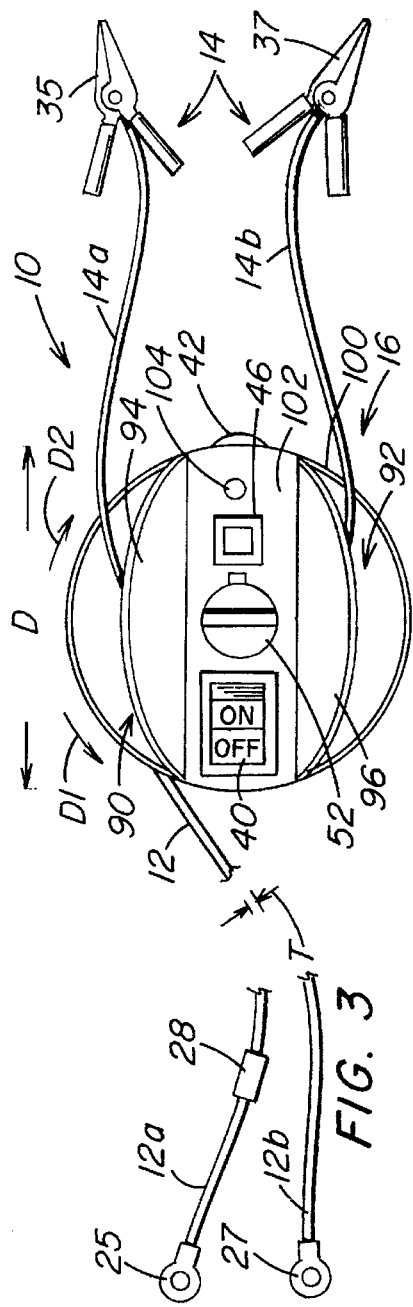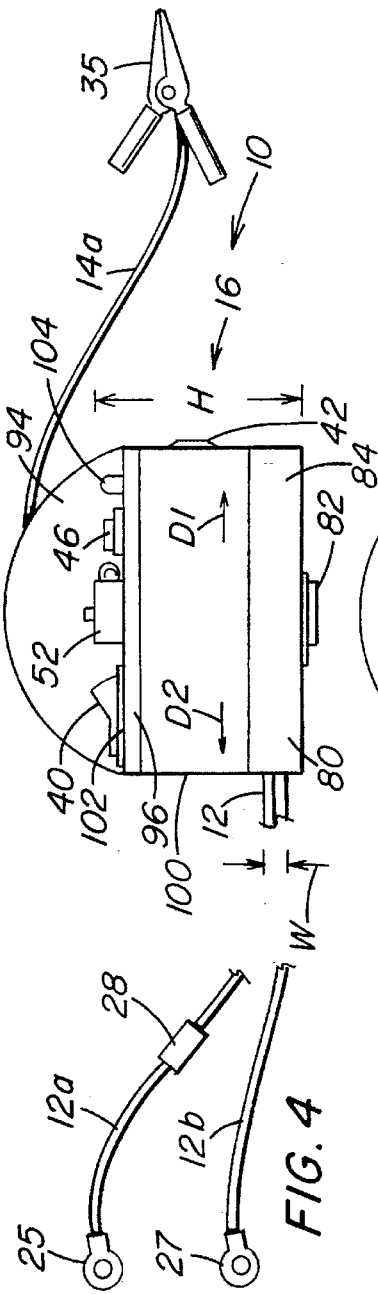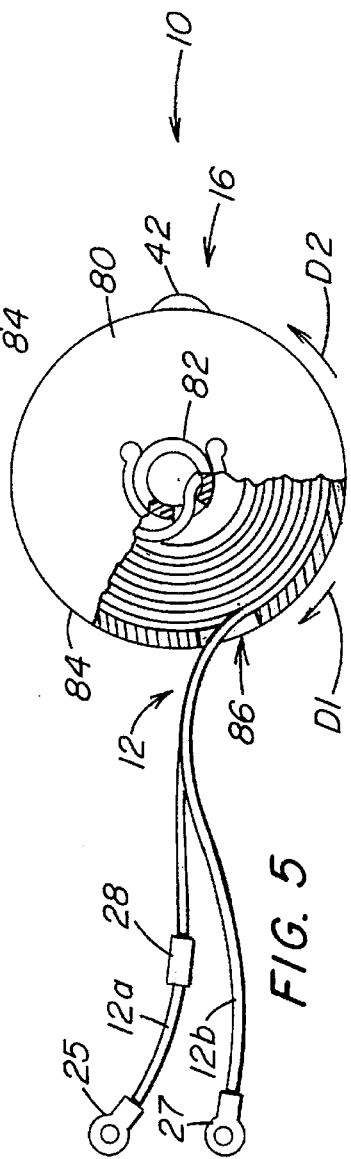

VEHICLE BATTERY CHARGING SYSTEM

BACKGROUND OF THE INVENTION

1. Field of the Invention

This invention relates to a vehicle battery charging system and, more specifically, to such a battery charging system that can be installed on one vehicle for selectively charging the battery of the one vehicle from another vehicle or visa-versa.

2. Description of the Prior Art

It is not uncommon for the battery of a vehicle to be inadvertently discharged to the extent the there is insufficient power to be able to crank and/or start the vehicle. Such a condition may arise because the operator of the vehicle has mistakenly left the lights, radio, or other electrical power consuming device or accessory running in the vehicle after the ignition has been turned off. Without the engine, and thus the alternator, running, the only source of power is the battery which in time can be sufficiently depleted to reduce its reserve capacity below that needed to restart the engine. A similar reduced capacity condition for the battery can occur when the battery has degraded with age so that it is incapable of starting the vehicle at a low ambient temperature or is near the end of its useful life and is incapable of holding a charge over a long period of time.

It is recognized by those skilled in the art that a vehicle battery under such conditions is often referred to as a "dead" battery even though it is only depleted to an extent that it is incapable of starting the engine. There must be sufficient power capacity in the battery that can be sustained for a long enough time for the starter relay to be closed and remained closed to be able to deliver an appropriate starting current to the starter motor to initiate the starting operation of an internal combustion engine. If the internal combustion engine is a standard engine, sufficient power must be maintained at the spark plugs to sustained ignition. If, on the other hand, the engine is a diesel engine, there must be sufficient power to maintain glow plug activation for the starting sequence of the diesel engine. There are several recognized means for restoring a battery to a charged condition. The most common includes starting the engine, by whatever means is available, and allowing the alternator of the running engine to simply recharge the battery through a normal recharging circuitry typically incorporated in the electrical system of most vehicles. Alternatively, an outside source can be connected to the dead battery to raise its capacity sufficiently to enable it to then provide its normal function of supplying the power needed to start the engine.

U.S. Pat. No. 5,194,799 discloses a booster battery assembly that serves as a power source, in addition to the normal vehicle battery, that can be used to start the engine of the vehicle if the normal battery is incapable of providing starting power. Once the engine of the vehicle is started with the booster battery, the alternator will allow the continued operation of the vehicle, the recharging of the normal battery, and, perhaps, the recharging of the booster battery, so that the vehicle can be started by either the normal or booster battery when needed the next time. This system is unusual and not normally preferred because of the need to provide a permanent additional battery.

Instead, the normal means used to start an engine having a depleted battery includes some type of "jumper" system which allows the temporary connection of a secondary power source to the vehicle electrical circuitry for starting of the engine. Once the engine is running, it is capable of continued operation though the use of the alternator without any further need for the secondary power source.

U.S. Pat. Nos. 3,590,357; 4,157,492; 4,757,250; 4,769,586; and 4,885,524 disclose systems that can be temporarily connected to the electrical circuitry of a vehicle to provide some type of "jumping" power for starting the engine of the vehicle. Once the engine is started, the system can be disconnected so that the normal battery can be recharge by the engine. While all of these systems include a number of specific elements and features intended to increase their reliability or effectiveness, they basically function in a manner that is well known to most vehicle operators who have previously used less sophisticated "jumper cables" systems.

Serious dangers can exist by the improper use of these less sophisticated jumper cables that simply employ a pair of cables with alligator-type clamps for respectively connecting the positive terminal of the active battery to the positive terminal of the weak battery and the negative terminal of the active battery to the negative terminal of the weak battery. A first danger can exist by the incorrect connection of the positive terminals to the negative terminals. A second danger could result in a battery gas explosion that could occur by the production of sparks at a terminal that could ignite hydrogen gas given off by the battery.

If the polarities of the batteries are mismatched or reversed, that is, with the positive terminal of each battery connected to the negative terminal of the other battery, serious damage can occur to the batteries, the booster cables, and even to the electrical system of the vehicles. Furthermore, and more importantly, the electrical connection of two batteries in the state of reverse polarity can cause an explosion that would place the individual performing the "jumping" procedure at great risk of personal injury.

Batteries, of the type found in automobiles, boats and other vehicles, generate hydrogen and oxygen gases at the plates thereof that are highly explosive. In the event that these gases escape and collect in the vicinity of the terminals of the battery, they can be ignited by any sparks or arcing at the terminal. Such a combustion could rupture the battery casing and cause electrolyte (sulfuric acid and water) to be sprayed or spilled over an individual or object in the immediate vicinity.

U.S. Pat. No. 3,590,357 discloses a complicated system including two twelve volt batteries that may be employed to provide a "boost" to another twelve volt battery or a twenty-four volt battery of another vehicle that has insufficient power to start the vehicle. Although the system includes a polarity detector system, some minimum voltage on the weak battery is required to operate the polarity detector. Although the overall system is quite complicated and expensive, it includes nothing to prevent a possible electrical flash or explosion that would be possible by the introduction of sparks at the weak battery.

U.S. Pat. No. 4,157,492 discloses a specifically designed jumper cable system that includes mechanical means for insuring that the polarity is correct. Unfortunately, both cars would be required to employ compatible hardware including costly "high current" equipment. There is no evidence that such a system has been accepted for the reliable jumping of one battery by another.

U.S. Pat. No. 4,757,250 discloses a three cable booster assembly that is intended to prevent the production of sparks that could result in a battery explosion. The cables include a polarity indicator to indicate if the cable is not properly connected so that the operator will be able to reposition the cables until the correct polarity is obtained. Assuming that the polarity is correct, a time delay circuitry prevents the actual connection between the batteries until there is contact made at each of the terminals. This is intended to minimize the possibility of any sparking that could occur through temporary contact made at the terminals themselves during the connecting process. There is means provided to prevent any current flow between the terminals if there is an interruption of contact at one of the positive terminals. This is intended to prevent a spark from being created if contact is inadvertently interrupted at a particular positive terminal. The components required to provide these safety features appear to be very complicated and expensive and require high current cables to support the current needed to start the engine.

U.S. Pat. No. 4,769,586 discloses battery jumper cable apparatus that includes complicated circuitry for allowing the ends of the cables to be connected to either battery terminal of the batteries by incorporating internal sensing and coupling means to selectively connect the batteries with proper polarity. This "automatic" coupling is relatively complicated and requires expensive components to insure the positive terminals are connected and the negative terminals are connected during the booster operation.

U.S. Pat. No. 4,885,524 includes an entire vehicle battery system that employs an adapter over the battery thereof to provide polarized connections to the starter system of the vehicle and for a cable that includes a remote polarized coupling at the grill of the vehicle. If this system were to be universally accepted, polarized connection could be made at the grills of two similarly configured vehicles for jump starting the battery of either vehicle from the other. However, one embodiment recognizes the likelihood that another vehicle may not have a similar system and, therefore, utilizes a jumper cable having the polarized adapter to the grill of the one vehicle with connector clamps for the battery of the other vehicle that is not so configured. When utilizing such a configuration, it is clear that the temporary connection being made to the second vehicle that does not employ the polarized system must be carefully done to insure that the polarity is proper to prevent the problems associated with reverse polarity as discussed above.

The systems which include jumper cables are intended to provide a high current boost from a charged battery of one vehicle to the ignition system of a second vehicle having a weak battery so that the engine of the second vehicle can eventually be employed to charge the weak battery. However, there are different systems which allow the independent direct "trickle" charging of a weak battery itself. A number of well-known battery charging systems, such as that disclosed in U.S. Pat. No. 4,829,223, convert normal alternating current to direct current to slowly and directly charge a weak battery without the use of the battery system of another vehicle. Other systems like those disclosed in U.S. Pat. Nos. 4,829,223; 3,806,790; 4,258,305; and 4,617,506 are intended to provide a relatively low direct current for charging of a weak battery from a fully charged battery of another vehicle over an extended period of time.

U.S. Pat. No. 4,829,223 discloses a typical battery charging system that employs alternating current, for example, from a house wiring system. The battery charger converts the alternating current to direct current to provide a trickle charge to a depleted battery of a vehicle. In order to insure correct polarity with the battery being charged, the overall system employs cable means connected to the battery terminals to provide a polarized female plug that can be connected properly to the male plug from the battery charger. There is no specific indication of the amount of time that would be required to recharge the depleted battery. However, unless such a battery charger is a heavy-duty type that might be utilized at service stations, it is expected that the charging time would be greater than an hour and could be several hours.

U.S. Pat. No. 3,806,790 discloses means for providing a dual battery charging system that automatically charges an auxiliary battery when the motor is operating and automatically disconnects the auxiliary system from the main system when the engine stops. While the system disclosed therein includes features that protect the auxiliary battery and insure that no damage would be done to the batteries if they are connected in a reverse, incorrect manner, the overall system is expensive and unlikely to be fully accepted because the requirement of a second battery.

U.S. Pat. No. 4,258,305 discloses a trickle charging device that, in its simplest form, includes a pair of cigarette lighter plugs having their negative contacts directly coupled together and having their positive contacts coupled by means of a current limiting device such as an incandescent bulb. In use, one of the plugs is plugged into the cigarette lighter socket of a vehicle having a discharged battery and the other plug is plugged into the cigarette lighter socket of a vehicle having a fully charged battery. A low current will flow from the good battery and the good battery charging system to the weak battery through the incandescent light to trickle charge the weak battery. The incandescent bulb serves the dual function of limiting the charging current and acting as a charging rate indicator. A shorting sleeve is also disclosed for shorting the contacts of one of the plugs so that the incandescent bulb can be used as an emergency light. The system discusses the preferred operation of the engine of the charging battery so that the electric generation system constantly recharges of the battery. Additionally, there is an indication that the preferred maximum charging current would only be about eight amps that would clearly be within the capacity of the wiring associated with cigarette lighter socket. According to the disclosure therein, the anticipated period of time required for a completely discharged battery to become recharged sufficiently to start most cars would be approximately 15 or 20 minutes. However, it is felt that any claim of such a short period of time would be extremely difficult to support and that the expected, low charging rate would require one or more hours to adequately raise a fully discharged battery to a level required to start a car.

U.S. Pat. No. 4,617,506 includes a battery trickle charging system that again appears to employ means for connecting the batteries of two vehicles through the cigarette lighter systems for charging a depleted battery from a fully charged battery. The vehicle having the fully charged battery would be started to insure that the battery system thereof is maintained at capacity during the trickle charge. Although there is no indication therein of the particular current flow through the system, it is expected that the charging time for restoring a depleted battery to a charged condition would again be one or more hours, as was the case with the device of U.S. Pat. No. 4,258,305.

OBJECTS OF THE INVENTION

It is an object of the present invention to provide an emergency charging device that can be utilized to rapidly charge the battery of one vehicle from the battery and electrical system of another vehicle.

It is another object of the invention to provide such an emergency charging device that is rigidly connect to the battery of a vehicle for convenient use with any other vehicle.

It is yet another object of the invention to provide such an emergency charging device that includes means to insure that the batteries can be connected without producing any sparking or arcing and without any danger associated with a reverse polarity condition.

It is still another object of the invention to provide such an emergency charging device that includes lighting means and an electrical fitting for possible use in an emergency situation.

It is also an object of the invention to provide such an emergency charging device that is light weight, easy to use, and relatively inexpensive to provide. These and other objects of the invention are provided in a preferred embodiment thereof which includes an emergency vehicle battery charging device for being utilized to connect a first pair of battery terminals of a first battery of a first vehicle to a second pair of battery terminals of a second battery of a second vehicle. The battery charging device is for allowing the second battery, when the second vehicle is not running, to be charged from the first battery, when the first vehicle is running, and, alternatively, for allowing the first battery, when the first vehicle is not running, to be charged from the second battery, when the second vehicle is running. The first and second vehicles are types that include engine systems having alternators that generate electrical current at a rated output which is within a range of a first predetermined maximum output current and a second predetermined maximum output current which is larger than the first predetermined maximum output current. The engine systems require a starting current that is substantially greater than the second predetermined maximum output current. The emergency vehicle battery charging device includes a control housing, a first pair of cables extending from the control housing for being connected to the first pair of battery terminals of the first battery, and a second pair of cables extending from the control housing for being connected to the second pair of battery terminals of the second battery. One of the first pair of cables, the second pair of cables, and the control housing includes a circuit switch for selectively connecting the first pair of the cables to the second pair of the cables. A current limiting circuit breaker is in at least one of the first pair of cables, the second pair of cables, and the control housing for limiting a charging current through the first pair of cables, the second pair of cables, and the control housing to a predetermined maximum charging current. The predetermined maximum charging current is less than the second predetermined maximum output current of the alternators. The control housing includes a polarity detecting element for detecting a correct correspondence of the first pair of battery terminals of the first battery with respect to the second pair of battery terminals of the second battery and an incorrect correspondence of the first pair of battery terminals of the first battery with respect to the second pair of battery terminals of the second battery when the first pair of cables are connected to the first pair of battery terminals of the first battery and the second pair of cables are connected to the second pair of battery terminals of the second battery. The polarity detecting element includes a first indicator for indicating the correct correspondence of the first pair and the second pair of battery terminals through the first and the second pair of cables and second indicator for indicating the incorrect correspondence of the first pair and the second pair of battery terminals through the first and the second pair of cables. The first pair of cables, the second pair of cables, and the control housing are capable of conducting the charging current up to the predetermined maximum charging current from the first pair of battery terminals to the second pair of battery terminals when charging the second battery from the first vehicle and, alternatively, from the second pair of battery terminals to the first pair of battery terminals when charging the first battery from the second vehicle.

In one preferred emergency vehicle battery charging device, the first pair of cables is for being rigidly connected to the first pair of battery terminals of the first battery and the second pair of cables is for being selectively, temporarily connected to the second pair of battery terminals of the second battery. The circuit switch is in the control housing. One form of the control housing includes selectively energized light source. The current limiting circuit breaker is in one of the first pair of cables adjacent to a corresponding one of the first pair of battery terminals of the first battery to which the one of the first pair of cables is to be rigidly connected.

A preferred polarity detecting element includes a detecting circuit that has a normally open circuit switch and the normally open circuit switch is closed when the circuit switch is closed to allow the charging current to pass therethrough.

In the preferred emergency vehicle battery charging device, the predetermined maximum current is greater than the first predetermined maximum output current.

The first pair of cables is preferably at least four times as long as the second pair of cables. A preferred control housing includes a first cable storage structure and the first pair of cables are disposed for being wrapped about the first cable storage structure when the battery charging device is not being used to charge one of the first and second batteries from the other of the first and second vehicles.

The control housing can also include second cable storage structures for storage of the second pair of cables therein when the battery charging device is not being used to charge one of the first and second batteries from the other of the first and second vehicles.

The first indicator can include an energized green light element, the second indicator can include an energized red light element, and the green light element and the red light element can be on the control housing.

Another preferred embodiment of the invention includes a battery charging device for electrically connecting a first pair of battery terminals of a first battery of a first vehicle to a second pair of battery terminals of a second battery of a second vehicle. The first pair of battery terminals includes a first positive terminal and a first negative terminal. The second pair of battery terminals includes a second positive terminal and a second negative terminal. The battery charging device is for allowing the second battery, when the second vehicle is not running, to be charged from the first battery, when the first vehicle is running, and, alternatively, for allowing the first battery, when the first vehicle is not running, to be charged from the second battery, when the second vehicle is running. The first and second vehicles are types that include engine systems having alternators that generate electrical current at a rated output which is within a range of a first predetermined maximum output current and a second predetermined maximum output current which is larger than the first predetermined maximum output current. The engine systems require a starting current that is substantially greater than the second predetermined maximum output current. The battery charging device includes a control housing, a first pair of cables having a first positive cable and a first negative cable, and a second pair of cables having a second positive cable and a second negative cable. The first positive cable and the first negative cable extend from the control housing for respectively being rigidly connected to the first positive terminal and the first negative terminal. The second positive cable and the second negative cable extend from the control housing for respectively being temporarily connected to the second positive terminal and the second negative terminal during the charging of one of the first battery and the second battery from the other of the first battery and the second battery. The control housing includes a circuit switch for selectively connecting the first positive cable to the second positive cable. A current limiting circuit breaker is in at least one of the first positive cable and the first negative cable for limiting a charging current through the first pair of cables, the second pair of cables, and the control housing to a predetermined maximum charging current of the alternators. The predetermined maximum charging current is within a charging range of about one-sixth to about one-fourth of the starting currents. The control housing includes a polarity detecting element for detecting a correct polarity, with the second positive cable connected to the second positive terminal and the second negative cable connected to the second negative terminal, and an incorrect polarity, with the second positive cable connected to the second negative terminal and the second negative cable connected to the second positive terminal. The polarity detecting element includes a first indicator for indicating the correct polarity and a second indicator for indicating the incorrect polarity. The first pair of cables, the second pair of cables, and the control housing are capable of conducting the charging current up to the predetermined maximum charging current from the first pair of battery terminals to the second pair of battery terminals when charging the second battery from the first vehicle and, alternatively, from the second pair of battery terminals to the first pair of battery terminals when charging the first battery from the second vehicle.

The preferred current limiting circuit breaker in the one of the first positive cable and the first negative cable is adjacent to the first battery.

In one form of the battery charging device, the polarity detecting element includes a detecting circuit that is electrically connected between the second positive cable and the second negative cable. The detecting circuit includes a normally open circuit switch. The normally open circuit switch is closed when the circuit switch is closed to allow the charging current to pass between the first positive terminal and the second positive terminal.

The predetermined maximum charging current is preferable greater than the first predetermined maximum output current.

The first pair of cables should be at least four times as long as the second pair of cables.

The control housing can include a central access tube and a first cable storage compartment mounted for relative rotation around the central access tube. The first pair of cables extends through the central access tube to an interior of the first cable storage compartment. The first pair of cables are disposed for being wrapped about the central access tube with only an end of the first pair of cables extending through an exit opening of the first cable storage compartment toward the first battery when the battery charging device is not being used to charge one of the first and second batteries from the other of the first and second vehicles.

The control housing can also include second cable storage structures for storage of the second pair of cables therein when the battery charging device is not being used to charge one of the first and second batteries from the other of the first and second vehicles.

A preferred first indicator includes an energized green light, a preferred second indicator includes an energized red light, and the green light and the red light are on the control housing.

In still another preferred embodiment of the invention, a battery charging system is for selective electrical connection of a first pair of battery terminals of a first battery of a first vehicle to a second pair of battery terminals of a second battery of a second vehicle for the selective charging of one of the first battery and the second battery from the other of the first vehicle and the second vehicle. The first pair of battery terminals includes a first positive terminal and a first negative terminal. The second pair of battery terminals includes a second positive terminal and a second negative terminal. The first and second vehicles are types that include engine systems having alternators that generate electrical current at a rated output between 35 and 60 amps. The engine systems require starting currents between 200 and 250 amps. The battery charging system includes an emergency charging device having a first pair of cables, a second pair of cables and a control housing therebetween. The first pair of cables has a first positive cable and a first negative cable and the second pair of cables has a second positive cable and a second negative cable. The first positive cable and the first negative cable extend from the control housing and are rigidly connected respectively to the first positive terminal and the first negative terminal. The second positive cable and the second negative cable are for respectively extending from the control housing to be temporarily connected to the second positive terminal and the second negative terminal during the charging of one of the first battery and the second battery from the other of the first vehicle and the second vehicle. The control housing includes a charging switch for selectively connecting the first positive cable to the second positive cable. A current limiting circuit breaker is in at least one of the first positive cable and the first negative cable for limiting a charging current through the first pair of cables, the second pair of cables, and the control housing to a maximum charging current which is between 40 and 60 amps. The control housing includes a polarity detecting element for detecting a correct polarity, with the second positive cable connected to the second positive terminal and the second negative cable connected to the second negative terminal, and an incorrect polarity, with the second positive cable connected to the second negative terminal and the second negative cable connected to the second positive terminal. The polarity detecting element includes an energized green light on the control housing for indicating the correct polarity and an energized red light on the control housing for indicating the incorrect polarity. The polarity detecting element includes a detecting circuit electrically connected between the second positive cable and the second negative cable. The detecting circuit includes a normally open magnetic switch which is closed when the charging switch is closed to allow the charging current to flow between the first positive terminal and the second positive terminal. The first pair of cables, the second pair of cables, and the control housing are capable of conducting the charging current up to the maximum charging current from the first pair of battery terminals to the second pair of battery terminals when charging the second battery from the first vehicle and, alternatively, from the second pair of battery terminals to the first pair of battery terminals when charging the first battery from the second vehicle. As a result, the battery charging device allows the second battery of the second vehicle, when the second vehicle is not running, to be charged from the first battery, when the first vehicle is running, and, alternatively, allows the first battery of the first vehicle, when the first vehicle is not running, to be charged from the second battery, when the second vehicle is running.

BRIEF DESCRIPTION OF THE DRAWINGS

FIG. 3 is an elevational view of the emergency charging device showing the front of the control housing with both pairs of cables extending therefrom.

FIG. 4 is a view similar to that of FIG. 3 of the emergency charging device showing the side of the control housing but with only one of the cables extending toward a battery for temporary connection therewith and the other cable stored within the control housing.

FIG. 5 is another view similar to that of FIGS. 3 and 4 of the emergency charging device, partially in section, showing the back of the control housing with both pairs of cables stored within the control housing.

DETAILED DESCRIPTION OF THE PREFERRED EMBODIMENTS

Figure 1:
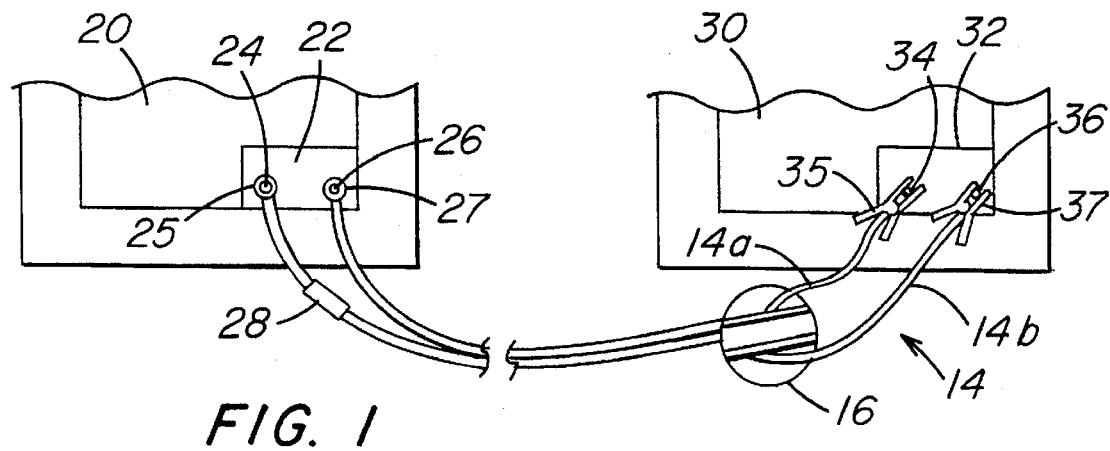
FIG. 1 is a top view of a typical installation of the preferred emergency charging device between two vehicles including various features of the invention.
Figure 2:
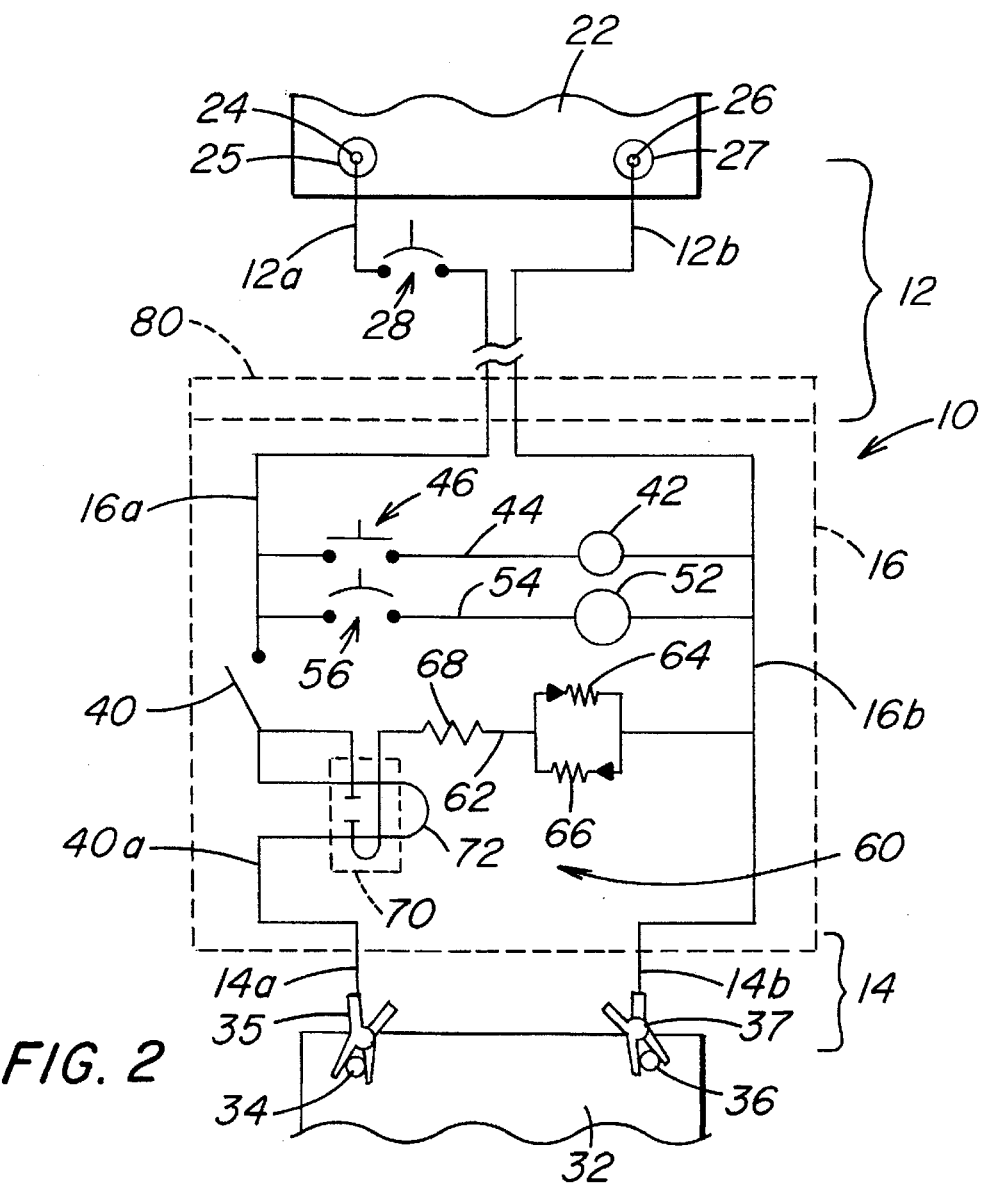
FIG. 2 is a schematic of the preferred electrical circuitry of the charging device including various features of the invention.

As seen in FIGS. 1 and 2, the preferred vehicle battery charging device 10 is for temporally connecting a first vehicle 20 and a second vehicle 30 for selectively charging one of the vehicle batteries thereof from the other. Specifically, when the vehicle battery charging device 10 is being used to charge a depleted battery, only the vehicle 20 or 30 that has the fully charged battery is to be running during the charging operation. The battery charging device 10 primarily includes a first pair of cables 12 and a second pair of cables 14 with a control housing 16 therebetween. The first pair of cables 12 is for being rigidly connected to a first battery 22 of the first vehicle 20 at a positive terminal 24 and a negative terminal 26 of the battery 22. The second pair of cables 14 is for being temporarily connected to a second battery 32 of the second vehicle 30 at a positive terminal 34 and a negative terminal 36 of the second battery 32.

Each of the vehicles 20 and 30 includes an internal combustion engine and an associated electrical system of a type that is well known to include an alternator, coil, starter, connecting cables, etc., that are operably connected to the respective battery 22, 32 thereof to provide power for starting and operate the vehicle. Although the electrical systems of the vehicles 20 and 30 are not shown in the Figures, it should be well known to those in the art that the alternators of the vehicles are capable of charging the respective batteries thereof when the vehicles are being operated. Once the battery is charged, there is sufficient power for providing electrical current from the battery to operate the starter for starting the engine the next time the vehicle is to be started.

Assuming that this charging capability of the alternator is operating properly, a good battery, if the time period is not too great, should be able to start the vehicle. However, if the battery has a reduced capacity through age, a trickle discharge, a low temperature condition, etc., there may not be sufficient power to operate the starter and start the engine.

It is at such times and under such conditions that the preferred vehicle battery charging device 10 can be safely and efficiently employed to return the weak battery to a charged and operable condition for starting its respective engine without further assistance from a second battery or vehicle. As mentioned above, other means could be alternatively employed to directly start the engine if the battery associated therewith is not initially capable of doing so.

There are well-known trickle charging devices that utilize an alternating current source, such as house current, which is converted to direct current to directly trickle charge a weak vehicle battery over an extended period of time that could be an hour or more. There are also vehicle-to-vehicle charging systems, such as those which utilize low current, cigarette lighter systems, which could also provide direct current from another vehicle battery system to trickle charge the weak battery over a similar extended period of time.

On the other hand, well-known jumper cable systems do not attempt to charge a weak or depleted battery from a charged battery of another vehicle. The jumper cables are capable of delivering very high currents from the engine system and the battery of a first operating vehicle to the engine system of a second vehicle having the weak battery to allow the second engine to be started. Once the engine of the second vehicle is started, the jumper cables should be removed and the engine system of the second vehicle should be able to charge the weakened battery, over time, through the continued running of the engine. Clearly, the use of a jumper cable system is quicker, requiring a couple of minutes to connect and a few seconds to start the engine, but the attendant dangers and problems discussed above can not be ignored. As will be seen from the detailed description provided hereinbelow, the preferred battery charging device 10 provides an attractive alternative to and a different charging method from either the trickle charging devices or the jumper cable devices discussed above.

The first pair of cables 12 includes a positive cable 12a and a negative cable 12b. The positive cable 12a has a ring connector 25 on the end thereof for being rigidly connected to the positive terminal 24 of the first battery 22. Similarly, the negative cable 12b has a ring connector 27 for being rigidly connected to the negative terminal 26 of the first battery 22. However, the positive cable 12a further includes a circuit breaker 28, which is intended to be responsive to any high current condition, when the overall system 10 is connected between the first battery 22 and the second battery 32. The circuit breaker 28 includes a thermal overload that is responsive to high current to cause the circuit breaker 28 to trip open if there were a bad polarity or high current situation. The thermal overload, after the circuit breaker is opened, would sense the reduced temperature and reset to close the circuit breaker 28 after a few seconds.

The second pair of cables 14 includes a positive cable 14a and a negative cable 14b. However, the positive cable 14a has an alligator clamp connector 35 on the end thereof for being temporarily connected to the positive terminal 34 of the second battery 32. The negative cable 14b of the second pair of cables 14 has an alligator clamp connector 37 for being temporarily connected to the negative terminal 36 of the second battery 32. However, the positive cable 14a does not include any circuit breaker such as included in positive cable 12a.

The positive cable 12a is operably connected to a first positive line 16a within the control housing 16. The control housing 16 further includes a second positive line 40a that is operably connected to the positive cable 14a of the second pair of cables 14. The first positive line 16a is not permanently connected to the second positive line 40a within the control housing 16. A mechanical switch 40 installed therebetween can be closed to electrically connect the positive cable 12a, the first positive line 14a, the second positive line 40a, and the positive cable 14a.

In the preferred configuration, the first pair of cables 12 and the second pair of cables 14 are formed from a single length of a long, two conductor cable. The positive cable portion is separated between the first positive line 16a and the second positive line 40a within the control housing 16 with the switch 40 mounted therebetween. However, there is no separation of the negative cable portion of the two conductor cable as the negative cable 12b the first pair of cables 12 is integral with the negative line 16b within the control housing 16 and with the negative cable 14b of the second pair of cables 14.

As thus described, the basic preferred battery charging device 10 may not appear to be that much different from either the trickle charging devices, such as those using cigarette lighter sockets, or the conventional jumper cables. In addition to the inclusion of a mechanical switch 40, the primary difference relates to the intended maximum current to be carried by the cables and the manner in which the device 10 is to be used. The preferred device 10 includes positive cables or lines 12a, 16a, 40a and 14a and negative cables or lines 12b, 16b, and 14b that are clearly rated to carry significantly more current that the trickle charging devices and significantly less current than the jumper cable devices. The key to regulating the maximum current to be carried by the cables or lines is the circuit breaker 28. The circuit breaker 28 is rated for a maximum current that is well below that needed to jump start a battery but is well above that needed to trickle charge a battery through a cigarette lighter system.

Typically, the starting current through a jumper cable system is in the 200 amp to 250 amp range because the high current demand of the starter system of the vehicle with the weak battery requires significant current from the running vehicle and the electrical system thereof to actually start the vehicle having the weak battery. This very high current, although only intended for a very short period of time, requires that the cables be rated well above this 250 amp level in order to be able to safely carry the required current. Consequently, these cables and the alligator clamps thereon are heavier and more expensive in order to insure that the starting current can be safely sustained without burning up or being destroyed. It should also be noted that these higher currents are capable of producing greater sparking and arcing that tend to be more dangerous. The potential sparking and the problems with polarity tend to discourage anyone who are not sure or confident of themselves around vehicle operating systems from using such jumper cable systems in an emergency.

On the other hand, the trickle charging devices, such as those which employ the cigarette lighter fittings, operate at a much lower current. These devices are not intended to jump start a vehicle but to directly charge the weak battery to raise its capacity to a level that will enable it to provide the high currents to the starter system required to start the vehicle. Once running, the alternator of the vehicle will be able to bring the previously weak battery up to a fully charged condition. The weak battery that is too low to start a vehicle may have some capacity but not enough to start the vehicle or maybe nearly dead without any significant capacity at all. Accordingly, a weak battery might be able to generate from 0 to 180 amps but clearly not enough to start the engine. The trickle charging system, since it is carrying current through very low current wiring, is only capable of providing current at a low level of about 6 amps to 15 amps. The wiring is much lighter and inexpensive but the time required to transfer power to a dead or weak battery is much longer depending on the level of the battery and the amount of increase that is needed to raise the potential to that which is necessary to provide the 200 to 250 amps needed for the starter. Such a system typically operates at about the 8 amp level in a system that probably includes a 20 amp fuse as current protection to insure that the wiring will not be able to carry a higher current that would speed up the charging operation but would burn up or destroy the lower rated wiring. Accordingly, the trickle charging system may include components that are less expensive but may require several hours to charge the battery. It is recognized that one of the prior art devices discussed above appears to imply that a trickle charge can be provide to a weak battery in 15 to 20 minutes. However, it is highly questionable whether such a short time can be expected if the weak battery has a very low potential or if the starter, for example, in a cold engine or cold oil condition, were to require an unusually higher starting current. Instead, it is expected that a trickle charge would require one or more hours to charge a battery sufficiently to start a vehicle. If the operator incorrectly assumes that a sufficient charge has been provided and tries to start the engine, it is quite possible that the battery power could be sufficiently lowered by the starting operation to require the entire process to be needed again and to require another one-half hour or more to raise the battery level for another try. Consequently, such trickle charging systems are not considered emergency systems since the time required is so long and of questionable value if the vehicle is to be used in the near future. Typically, such trickle charging systems are only reliably used when time is not of the essence and it can be assured that ample time is available to raise the weak battery level to a fully charged condition that is clearly enough to start an engine even if the engine and oil are cold.

The preferred emergency charging system 10 is not configured for nor capable of providing the 200 or 250 amps needed to start an engine. Instead, the emergency charging system 10 is intended and configured to provide an emergency, rapid charge directly to the weak or "dead" battery at a higher rate, about 50 amps maximum, to require much less time than the trickle charging systems discussed above. The charging rate is preferably between about one-sixth and about one-fourth of the starting current. Although a fully dead battery, one that has been shunted to have no potential, might require as much as 15 minutes to charge, an adequate charge for most weak or "dead" batteries to start a vehicle with the device 10 should not require more than 3 to 5 minutes. In such a case, if it is determined that the first charge was inadequate, the second charge would be possible in a comparable time so that it would be expected that any vehicle could be started within 5 or 10 minutes. While this is clearly slower that a jump starting method, the currents are lower and less likely to intimidate those who would not be inclined to use the higher currents of the jumper cable systems. The charging current rating of a maximum of about 50 amps, within a range of about 40 amps to about 60 amps, was chosen as a compromise to reduce the cost and complexity of the components but to increase the charging rate to a practical level to insure that the time required is not too great. Additionally, the rate of about 50 amps is comparable to the current level generated by most alternators of a wide range of vehicles with which such an emergency charging device 10 might be employed. Typically, alternators, depending on many factors, are designed to produce a maximum current output within a range of 35 amps to 60 amps.

If the preferred charging device 10 is being used properly to transfer power from a running vehicle that has an alternator with a maximum output of 35 amps, it is expected that the system will never experience a current higher than the 35 amps and that the circuit breaker 28 will never open. The positive and negative cables and lines will be carrying current at the rate of 35 amps to charge a weak or dead battery at a significantly faster rate than the trickle charging devices discussed above.

On the other hand, if the preferred emergency charging device 10 is being used properly to transfer power from a running vehicle that has an alternator with a maximum output of 60 amps, it is expected that the system will initially experience a higher current than the 50 amps that circuit breaker 28 will allow to cause it to initially open. However, after a short time of a few seconds, the breaker 28 will close to again attempt to transfer current at the higher rate of about 60 amps but could again be opened by the high current condition. One might think that this would be repeatedly for an indefinite number of times. However, it has been found that each time that the circuit breaker 28 is closed, even for the short amount of time required to heating sufficiently to open, some current is transferred to the weak or dead battery. In other words, the 60 amp level delivers some power to the battery but, because of the heating and opening of the circuit breaker, not long enough to damage the positive or negative cables or lines rated to withstand a current of 50 amps for a period of time. Nevertheless, the delivery of current for the short amount of time prior to opening has been found to raise the potential of the weak or dead battery toward a charged condition. After several cycles of the circuit breaker 28, the level of the weak battery has been sufficiently raised to decrease the demand on the alternator of the running vehicle. When the demand on the running vehicle is sufficiently lowered by the increased capacity of the weak battery, the alternator will discontinue operating at the full or maximum capacity of 60 amps and will tend to only generate current at a level below 50 amps. Once this level is obtained, after several cycles of the circuit breaker 28, the circuit breaker 28 will remain closed and the charging of the weak battery will continue at the acceptable, rapid current rate as discussed above.

Although the basic emergency charging device 10 (assuming that the mechanical switch 40 is closed) would operate in an entirely different manner for an entirely different result than the jumper cable systems or the trickle charging systems, there would still be legitimate concerns about incorrect polarity or undesired sparking at the battery terminals. However, the mechanical switch 40 and several other features are incorporated in the charging device 10 to insure the safe and reliable operation that may not be available with many of the devices of the prior art discussed above.

For example, while no mention has been made of which vehicle is being charged, the one to which the pair of cables 12 are rigidly attached, vehicle 20, or the one to which the cables 14 are to be temporarily attached, vehicle 30, the device 10 can be used to charge the battery of either vehicle 20 or 30 from the other vehicle 30 or 20. The switch 40 should be maintained in the "off" position to open the electrical contact between the positive lines 16a and 40a until the alligator clamps 35 and 37 can be respectively connected to the positive terminal 34 and the negative terminal 36 of the battery 32 of the vehicle 30. This operation will be the same whether the first battery 22 or the second battery 32 is the weak battery which is to be charged. In either case, the isolation of the positive cables 12a and 14a will prevent the sparking or arcing at either the positive terminal 34 or the negative terminal 36 that would be so dangerous when a jumper cable system is used. It may appear obvious that the opening of the switch 40 would prevent any sparking or arcing at the positive terminal 14a. It is probably less obvious that the opening of the switch 40 would also prevent any sparking at the negative terminal 14b. Even though the negative cable 12b, negative line 16b, and negative cable 14b include no switch, when correctly installed, no current would be passed between the negative terminals 26 and 36. However, it may not seem as obvious that no sparking will occur if the negative cable 14b and the alligator clamp 37 thereof are inadvertently coupled to the positive terminal 34 of the battery 32. Although there is a "potential" difference between the negative terminal 26 of the first battery 22 and positive terminal 34 of the second battery 32, there is no complete electrical circuit therebetween. Each negative terminal 26 and 36 may be electrically coupled to the "ground" of their respective vehicles but there is no electrical connection therebetween to form a closed circuit. Only the connection of the positive cables and lines, with the switch 40 in the closed position, could complete a circuit in a manner which could result in a spark or arc. With the switch 40 open, no spark or arc can be produced at either terminal 34 or 36 by the alligator clamps 35, 37 whether they are correctly or incorrectly installed on the second battery 32.

It is expected that this feature of preventing the possibility of a spark at either terminal 34 of 36 of the battery 32 will increase the acceptability of the charging device 10 as compared with any jumper cable system of the types described hereinabove. This isolation of the pair of cables 12 and 14 allows a safe coupling of the cable 14 to the battery terminals 35 and 37 of the second battery 32 when either the vehicle 20 or 30 is operating for the charging of the battery of the other.

It might appear that a similar mechanical switch, such as switch 40, could be employed in a jumper cable system. However, as discussed above, the current requirements for such a jumper cable system, which would be in the 200 to 250 amp range, would require the mechanical switch to have a higher current rating and to be much more expensive to provide.

Another advantage of the preferred charging cable 10 is obtained by the combined features of the mechanical switch 40 and the circuit breaker 28. Thus far, it has been generally assumed that the connection of the pair of cables 14 to the battery 32 has been correct, with the alligator clamp 35 on the positive terminal 34 and the alligator clamp 37 on the negative terminal 36. If this is the case, the charging operation will begin in the manner described above, in the direction toward the weak battery. The operating vehicle 20 or 30, independent of the rating of the alternator, will charge the other battery 32 or 22 even if there is some initially cycling of the circuit breaker 28. However, with the mechanical switch 40 in the open position, it would be possible to incorrectly attach the alligator clamp 35 to the negative terminal 36 and the alligator clamp 37 to the positive terminal 34 of the battery 32. No sparking at the terminals would occur but it would be extremely dangerous if the batteries were connected with reversed polarity. Upon closing the mechanical switch 40, with an incorrect polarity, there would be a high surge of current in the positive cables and lines 12a, 16a, 40a, and 14a. However, the relatively low rating of the circuit breaker 28, at about 50 amps, would cause it to very quickly open to prevent any damage to the charging device 10 or to either battery 22 or 32.

It should be noted that a similar incorrect connection of clamps and terminals could occur with many of the jumper cable systems of the types discussed above. If such a jumper cable system were to employ a higher rated, more expensive mechanical switch as discussed above, it is clear that without any current protect, as provided by the circuit breaker 28, the closing of the switch could damage or destroy either battery and/or the jumper cable connected therebetween and could seriously injure the operator and anyone in the vicinity. While it might be possible to employ some type of circuit breaker to prevent such an occurrence, it should be noted that the rating of the circuit breaker would clearly be above the typical maximum jumping current rate of 250 amps and there is no assurance that a circuit breaker set at such a high level would provide the desired protection for the batteries and the operator. Further, as mentioned above, the need for heavier, more expensive cables and switches, for such an alternative jumper cable system that could be reconfigured to have these features, would again be applicable for a circuit breaker to further increase the cost and decrease the acceptability of such a system.

It is interesting to note that these problems of sparking or bad polarity would not exist for the trickle charging devices that use the cigarette lighter sockets since there are no connections made at the battery terminals. The preferred emergency charging device 10 operates much quicker but could present these problems when connecting the batteries if the features of the circuit breaker 28 and switch 40 were not included. The preferred device 10 also includes other features that will further facilitate the efficient and reliable charging of a battery of one vehicle from another.

As seen in FIGS. 1, 2, 3, 4, and 5, in order to correctly facilitate the coupling of the pair of cables 14 to the battery 32, the pair of cables 12 are relatively long to allow the control housing 16 and the pair of cables 14 to be conveniently positioned at the vehicle 30 as the pair of cables 12 extends back toward the battery 22 to which it is rigidly attached. The preferred overall length of the pair of cables 12 and 14 is about twelve feet with the cables 12 being about four times the length of the cables 14.

The manner in which the long pair of cables 12 can be conveniently stored will be discussed in detail hereinbelow. However, with the control housing 16 positioned toward the other vehicle and the pair of cables 14 extending therefrom, it is desirable to include means for assisting the operator to make the correct temporary connection of the clamps 35, 37 to the terminals 34, 36. Accordingly, the preferred control housing 16 includes an emergency light 42. Power for the light 42 is provided by a light line 44 electrically connected between the first positive line 16a and the negative line 16b within the housing 16. The light line 44 preferably includes a "push on—push off" switch 46 to selectively energize the light 42. If the battery 22 is charged and the charging device 10 is being used to charge the battery 32, the light 42 can be used at night or in an unlighted environment to clearly examine the terminals 34, 36 of the battery 32 for a correct connection with the clamps 35, 37. The connections of the light line 44 to the first positive line 16a and the negative line 16b are at a side of the switch 40 to allow power from the battery 22 even if the switch 40 is open. If, on the other hand, the battery 22 is the weak battery and needs to be charged from another vehicle 30, there may or may not be enough power in the weak battery 22 to energize the light 42. Admittedly, if the battery 22 is completely dead, there would not be any power to the light 42 until and unless the switch 40 is closed and power is provided by the charged battery 32.

This emergency light feature, which can be helpful for connecting the pair of cables 14 to the battery 32, could also be employed by the operator of the vehicle 20 at other times for other emergency situations. The light 42 could, for example, be used to light a wheel region of the vehicle 20 or another vehicle nearby, if a tire must be changed in an unlighted area. Since there are a number of other emergency lights, tools, etc., such as an emergency tire inflating pump, that are configured to receive power from a cigarette lighter socket, the preferred control housing 16 also includes an electrical fitting 52 to selectively energize these types of devices. The electrical fitting 52 is provided in a fitting line 54 that is operably connected, like the light line 42, between the first positive line 16a and the negative line 16b. A thermal circuit breaker 56, with a rating similar to that associated with a cigarette lighter socket, is installed in the fitting line 54 to protect the electrical fitting 52 and the fitting line 54 from an unusual high current condition. Again, the electrical fitting 52 would be available at any time there is sufficient power in the battery 22 or, from the battery 32, when the switch 40 is closed.

Although the emergency charging device 10 has features to automatically protect against sparking and incorrect polarity, it includes other features that enable the operator to confirm that the charging device 10 is correctly operating throughout the charging process. The control housing 16 includes an indicator circuit 60 having an indicator line 62 that is electrically connected between the second positive line 40a and the negative line 16b. The indicator circuit 60 primarily includes a pair of lighting diodes 64 and 66 that are connected in parallel in the indicator line 62. The lighting diode 64 is preferably green and is configured to sense a current flow from the second positive line 40a to the negative line 16b. The lighting diode 66 is preferably red and is configured to sense a current flow from the negative line 16b to the second positive line 40a. Both of the lighting diodes are positioned at an indicator bulb 104 on the wall 100 of the control housing 16 to provide visual indication to the operator when they are energized. To protect the lighting diodes 64 and 66, the indicator line 62 includes a resistor 68 to limit the maximum current that can be transmitted through the indicator line 62 and the diodes 64 or 66.

If nothing else were provided and the switch 40 is open and the pair of cables 14 is not connected to the battery 32, there would be no means for any current to pass through the indicator line 62. With the closing of the switch 40, whether or not the pair of cables 14 is connected to the battery 32, it would appear that a potential difference between the second positive line 40a and the negative line 16b could generate a current flow through the indicator line 62. However, the indictor line 62 also includes a normally open magnetic switch 70. The switch 70 will remain open unless activated by a magnetic field to cause it to close. In the preferred indicator circuit 60, such a magnetic field can only be produced, within the control housing 16, by the flow of current through a single loop 72 that is formed in the second positive line 40a to extend around the normally open magnetic switch 70.

The normally open magnetic switch 70 is provided to insure that no current will pass through the indicator line 62 unless there is a flow of current through the second positive line 40a. Without this feature, there would be the possibility of passing a low current through the indicator line 62 by simply connecting the alligator clamps 35, 37 to the terminals 34 and 36 even when the switch 40 is open. Even a low current passing through the indicator line 62 might provide a source for current to the pair of cables 14 that could produce an undesired and dangerous sparking or arcing condition of the type discussed above. However, with the switch 40 open and the normally open magnetic switch 70 being unable to close until there is current passing through the second positive line 40a, neither correct nor incorrect coupling of the clamps 35 and 37 with the terminals 34 and 36 would produce any sparking or arcing that could cause an explosion at the battery 32.

Assuming an incorrect polarity exists, with the positive clamp 35 on the negative terminal 36 and the negative clamp 37 on the positive terminal 34, and the switch 40 is closed, the circuit breaker 28 will quickly open to protect the batteries 22 and 32, the device 10, etc. However, during the very shod period of time required to cause the opening of the circuit breaker 28, some current will pass through the second positive line 40a and the loop 72 thereof. During this short time period, the resulting magnetic field at the loop 72 will close the switch 70 in the indicator line 62 to allow current to pass therethrough. In this situation, the direction of the current flow would be from the negative line 16b to the second positive line 40a because of the higher potential generated at the positive terminal 34 of the battery 32 when it is coupled to the normally negative alligator clamp 37. Current flow in that direction will cause the red lighting diode 66 to be activated while the green lighting diode 64 remains inactive. Because of the rapid opening of the circuit breaker 28, the red lighting diode 66 will only be energized for the very shod period of time but will give an indication that the polarity is incorrect with the clamps 35, 37 improperly installed on the terminals 36, 34 of the battery 32.. The operator should, upon this indication, turn the switch 40 to the "off" position and reposition the clamps 35, 37 correctly on the terminals 34, 36. However, if the operator does not initially see the quick flash of the red lighting diode 66 and is not sure why there is no energizing of the green lighting diode 64, the switch 40 might not be opened and the clamps 35, 34 would remain on the incorrect terminals 34, 36. When this occurs, the circuit breaker 28 would again take several seconds to cool and return to a closed position. When the circuit breaker 28 closes, the high current condition caused by the incorrect polarity would again exist and the red lighting diode 66 would again momentarily flash on until the circuit breaker 28 is again opened by the high current. There would be periodic flashing of the red lighting diode 66 until the operator takes proper action to open the switch 40 and properly repositioned the clamps 35, 37 on terminals 34, 36. This indication of incorrect polarity will occur during the use of emergency charging devise 10 whether the operator is attempting to charge the first battery 22 from the second battery 32 or second battery 32 from the first battery 22.

On the other hand, if there is correct polarity between the first battery 22 and the second battery 32, when either battery is to be charged, closing switch 40 will produce a current flow through the second positive line 40a and the loop 72 thereof to cause the normally open magnetic switch 70 to close. The voltage potential between the second positive line 40a and the negative line 16b will produce a current flow in a correct direction through the green lighting diode 64 to indicate the charging operation has correctly begun. With such a condition, no further action is needed by the operator. After 3 to 5 minutes, the weak battery 22 or 32 should be restored to a sufficiently charged condition for starting the vehicle thereof. Again, as discussed above, if the operator believes that a sufficient charge has been added to the weak battery 22 or 32, it would be possible for the operator to assume a charged condition for the battery and to see if the vehicle can be started. Prior to attempting to start the vehicle of the charged battery 22 or 32, the operator should return the switch 40 to the "off" position. With the switch 40 open, the newly charged battery would be properly isolated from the charging battery so that the starting of the vehicle can be attempted. As mentioned above, if the vehicle of the newly charged battery does not properly start, a charge can be initiated again by closing the switch 40. Assuming that the second charge provided to the weak battery 22 or 32 is successful, the switch 40 would be opened to again attempt to start the vehicle. When the vehicle is properly started and its alternator is able to assume the charging of the battery to a full capacity, the clamp 35, 37 can be removed.

If the operator does not open the switch 40 prior to attempting to start the vehicle, the charging device 10 would be connected between the batteries 22, 32 in a manner similar to the jumper cable systems discussed above. However, if the attempt to start the vehicle produces a high current condition, the thermal circuit breaker 28 would open and protect the charging device 10. This protection would continue, even if the circuit breaker 28 were to cycle closed and opened several times, until the operator properly opens the switch 40 and removes the clamps 35, 37.

Although the activation of the green lighting diode 64 gives the operator an indication that the weak battery is being charged, it should be noted that the green lighting diode 64 includes an inherent feature that allows the operator to be completely assured that the weak battery is fully charged. Although not recommended because of the extended amount of time required, if the charging of the weak battery continues beyond that needed to raise the capacity sufficient to start the vehicle, the voltage potential of the weak battery will be raised until it approaches that of the charged battery. As the voltage potentials approach each other, the green lighting diode 64 will begin to dim. When the weak battery is charged to match the capacity of the battery of the operating vehicle, the green lighting diode 64 will go out. Accordingly, this feature could indicate to the operator that the weak battery has been returned to a fully charged condition even though less charging time might have produced a partially charged condition that would have been adequate to start the vehicle.

The indicating circuit 60 includes an additional feature which could be highly desirable when attempting to charge a weak battery. Assuming that the charging operation has properly begun and that the weak battery is initially being charged from the battery and electrical system of the other vehicle, it is important to know that proper electrical contact between the clamp 35 and the positive terminal 34 and between the clamp 37 and the negative terminal 36 is maintained throughout the charging operation. Without proper electrical contact, there would be no charging and the operator might incorrectly assume, after several minutes, that the weak battery has been charged. Accordingly, if there is any break in contact between the clamps 35, 37 and/or the terminals 34, 36, there would be an interruption of current through the second positive line 40a which would discontinue the charging operation. Additionally, the loss of current through the second positive line 40a, and thus the loop 72, will cause a loss of the magnetic field which is required to maintain the normally open magnetic switch 70 in the closed position. If the normally opened magnetic switch 70 opens, the green lighting diode 64 will be de energized. Consequently, if the operator has initially installed the charging device 10 for charging either battery 22 or 32 and the green lighting diode 64 is prematurely deactivated, the operator should open the switch 40 and reestablish proper contact between the clamps 35, 37 and the respective terminals 34, 36. If better electrical contact is produced, closing of the switch 40 will activate the green lighting diode 64 to indicate that proper charging is proceeding.

The features discussed hereinabove allow the operator to effectively and safely use the charging device 10. However, the preferred charging device 10 includes other physical features that facilitate the convenient use of the device 10 by the operator. For example, the ring connectors 25, 27 being respectively rigidly attached to the positive terminal 24 and the negative terminal 26 assures that the device 10 is available for use with the vehicle 20 at any time without having to be installed. The operator need only be concerned with extending the pair of cables 12, 14 between the vehicles 20, 30 and with properly connecting the clamps 35, 37 to the terminals 34, 36.

As best seen in FIGS. 3, 4 and 5, the overall size and weight of the preferred charging device 10 is significantly less than those of a jumper cable system of the type described above. Accordingly, the preferred charging device 10 can and should be conveniently stored in the engine compartment of the vehicle 20, preferably in a sealable plastic bag or compartment (not shown). Although the longer, first pair of cables 12 and second pair of cables 14 are lighter than cables required for jumper cable systems, the combined lengths thereof could present a problem during storage in the engine compartment. The preferred control housing 16 has a cylindrical shape and includes a cable storage means for the pairs of cables 12, 14. The overall size of the preferred control housing 16, with a combined length of about twelve feet of cables 12 and 14 stored therein, is significantly less than a twelve foot length of jumper cables and associated connector clamps. The control housing 16 would have a diameter D of about 5.5 inches and a height H of less than 4 inches. A cable storage compartment 80 on the back of the control housing 16 is mounted for rotation relative to the control housing 16 around a center access tube 82 of the control housing 16. The first pair of cables 12 extends from the interior of the control housing 16 through the center access tube 82 and is capable of being wrapped around the center access tube 82 within the rotatable cable storage compartment 80. The cable storage compartment 80 has a cylindrical outer wall 84 which is aligned with the cylindrical wall 100 of the control housing 16. The cylindrical wall 84 has an outlet opening 86 through which the end of the first pair of cables 12 having the ring connectors 25 and 27 and the circuit breaker 28 extend to the first battery 22. When properly stored, the first pair of cables 12 is wound around the center access tube 82, in a clockwise direction (FIG. 5), in a compact manner within the interior of the cable storage compartment 80 with only the end thereof extending through the opening 86 toward the battery 22.

In order to remove the full length of the pair of cable 12 from the interior of the cable storage compartment 80, the operator simply holds onto the cable storage compartment 80 with one hand, pulls the cable 12 from the interior thereof with the other hand, and allows the control housing 16, and the center access tube 82 thereof, to rotate in the first direction D1, as seen in FIGS. 3, 4, and 5. After the cable 12 is unwound from about the center access tube 82, the entire length of the first pair of cables 12 is available for extending the control housing 16 toward another vehicle 30.

The second pair cables 14, although much shorter, are also conveniently stored relative to control housing 16. Specifically, the control housing 16 includes two side compartments 90, 92 at opposite sides of a center wall 102 for separately storing the positive cable 14a and associated alligator clamp 35 and the negative cable 14b and associated alligator clamp 37. Each of the side compartments 90, 92 includes a hinged access door 94, 96 to entrap the respective cable and clamp therein when the charging device 10 is being stored.

The center portion of the control housing 16, between the compartments 90, 92 below the center wall 102, includes the electrical components discussed hereinabove. Mounted on the center wall 102 are the mechanical switch 40, the electrical fitting 52 and the light switch 46. The light 42 is installed on the cylindrical side wall 100 of the control housing 16 for being directed by the operator toward a desired area. Additionally, the center wall 102 includes an indicator bulb 104 which includes the green lighting diode 64 and the red lighting diode 66.

After either battery 22 or 32 is properly charged, the alligator clamps 35, 37 can be removed from the terminals 34, 36 of the battery 32. With the positive cable 14a and clamp 35 stored within the compartment 90 and the negative cable 14b and clamp 37 stored within the compartment 92, the doors 94, 96 can be closed. To rewind the cable 12 in a clockwise direction around the center access tube 82 (FIG. 5), the operator simply holds the cable storage compartment 80 in one hand and rotates the control housing 16 in the second direction D2 with the other hand. Proper winding of the pair of cables 12 around the center access tube 82 will entirely fill the interior of the cable storage compartment 80 to again only allow the end of the cables 12 attached to the battery 22 to extend from the opening 84. When completed, the entire device 10 can be reinstalled within the plastic bag or compartment in the engine compartment of the vehicle 20 for use at a later time.

The emergency charging device 10 includes numerous components that are relatively small and relatively inexpensive to provide. For example, the preferred two conductor, insulated cable forming the pair of cables 12 and 14 includes number 12 gage conductors and has a width W of under 0.5 inches and a thickness T of less than 0.25 inches. By carrying only 50 amps of current, the size and weight is much less and much easier to handle than the heavier-duty conductors of jumper cables rated to carry 200 to 250 amps during the starting operation. The similarly rated ring connectors 25, 27; circuit breaker 28; mechanical switch 40; and alligator clamps 35, 37 allow the device 10 to be lighter, easier to handle, and less expensive to provide.

To further understand the preferred device 10, it appropriate to discuss some of the preferred components thereof which have been found to reliably and safely provide the desired emergency charging function. For example, the electrical fitting 52 and the circuit breaker 56 are rated for 20 amps. The resistor 68 is a 680 ohm resistor and is intended to protect the red/green bi-polar diode 64, 66 and the normally open magnetic switch 70 which are each rated for 30 milliamps.

It should be clear that any number of changes could be made to the preferred emergency charging device by those skilled in the art without departing from the scope of the invention as claimed. For one example, the preferred cables 12 are intended to be rigidly connected to the battery 22. However, some aspects of the invention as claimed are quite significant and valuable and clearly recited in the claims in a manner that does not require the cables 12 to be rigidly connected to the battery 22. Although clearly not preferred, providing the cables 12 with means for temporarily connecting an emergency charging device to the battery would still result in an emergency charging device that is more mobile for use with any two batteries but in an effective and reliable manner that is not possible with the jumper cable or trickle charging systems discussed above. For another example, while the device 10 includes the cable storage compartment 80 and side compartments 90 and 92 for reliable, contained storage of the cables 12, 14, it would be possible to provide an alternative control housing which includes spool or bracket means for the winding of the cables 12, 14 thereon without their being separately encased within the control housing prior to it being installed within the sealable plastic bag or compartment in the engine compartment. While the preferred circuit breaker 28 is installed near the end of the first positive cable 12a, another location in the pair of cables 12 or 14 or within the control housing 16 could be employed to provide the same function. Additionally, while the switch 40 is preferably installed in the control housing in an effective and convenient location, there is nothing to prevent some forms of the invention from including a comparable switching means that could provide the same function but could be located elsewhere in the cable 12 or 14. Since the switch 40 should be open prior to the installation of the clamps 35, 37 on the terminals 34, 36, one aspect of the invention could include a mechanical coupling with one or both of the access doors 94, 96 to cause the switch 40 to be returned to the "off" position when the doors 94, 96 are opened.

What is claimed is:

1. An emergency vehicle battery charging device for being utilized to connect a first pair of battery terminals of a first battery of a first vehicle to a second pair of battery terminals of a second battery of a second vehicle; said battery charging device for allowing the second battery, when the second vehicle is not running, to be charged from the first battery, when the first vehicle is running, and, alternatively, for allowing the first battery, when the first vehicle is not running, to be charged from the second battery, when the second vehicle is running; the first and second vehicles being of types that include engine systems having alternators that generate electrical current at a rated output which is within a range of a first predetermined maximum output current and a second predetermined maximum output current; the second predetermined maximum output current being larger than the first predetermined maximum output current; the engine systems requiring a starting current that is substantially greater than the second predetermined maximum output current; said emergency vehicle battery charging device comprising:

a control housing;

a second pair of cables extending from said control housing for being connected to the second pair of battery terminals of the second battery;

one of said first pair of said cables, said second pair of said cables, and said control housing including circuit switch means for selectively connecting said first pair of said cables to said second pair of said cables;

current limiting means in at least one of said first pair of said cables, said second pair of said cables, and said control housing for limiting a charging current through said first pair of said cables, said second pair of said cables, and said control housing to a predetermined maximum charging current;

said predetermined maximum charging current being less than the second predetermined maximum output current of the alternators;

said predetermined maximum charging current being greater than the first predetermined maximum output current of the alternators;

said control housing including polarity detecting means for detecting a correct correspondence of the first pair of battery terminals of the first battery with respect to the second pair of battery terminals of the second battery and an incorrect correspondence of the first pair of battery terminals of the first battery with respect to the second pair of battery terminals of the second battery when said first pair of said cables are connected to the first pair of battery terminals of the first battery and said second pair of said cables are connected to the second pair of battery terminals of the second battery;

said polarity detecting means including first indicating means for indicating said correct correspondence of the first pair and the second pair of battery terminals through said first and said second pair of said cables and second indicating means for indicating said incorrect correspondence of the first pair and the second pair of battery terminals through said first and said second pair of said cables;

said polarity detecting means including a detecting circuit that has normally open circuit means;

said normally open circuit means being closed when said circuit switch means is closed to allow said charging current to pass therethrough; and said first pair of said cables, said second pair of said cables, and said control housing being capable of conducting said charging current up to said predetermined maximum charging current from the first pair of battery terminals to the second pair of battery terminals when charging the second battery from the first vehicle and, alternatively, from the second pair of battery terminals to the first pair of battery terminals when charging the first battery from the second vehicle.

2. The emergency vehicle battery charging device according to claim 1, wherein said first pair of said cables are for being rigidly connected to the first pair of battery terminals of the first battery and said second pair of said cables are for being selectively, temporarily connected to the second pair of battery terminals of the second battery.

3. The emergency vehicle battery charging device according to claim 2, wherein said circuit switch means is in said control housing.

4. The emergency vehicle battery charging device according to claim 3, wherein said control housing includes selectively energized illumination means.

5. The emergency vehicle battery charging device according to claim 2, wherein said current limiting means is in one of said first pair of said cables adjacent to a corresponding one of the first pair of battery terminals of the first battery to which said one of said first pair of said cables is to be rigidly connected.

6. The emergency vehicle battery charging device according to claim 1, wherein said first pair of said cables is at least four times as long as said second pair of said cables.

7. The emergency vehicle battery charging device according to claim 6, wherein said control housing includes first cable storage means and said first pair of said cables are disposed for being wrapped about said first cable storage means when said battery charging device is not being used to charge one of the first and second batteries from the other of the first and second vehicles.

8. The emergency vehicle battery charging device according to claim 1, wherein said control housing includes second cable storage means for storage of said second pair of said cables therein when said battery charging device is not being used to charge one of the first and second batteries from the other of the first and second vehicles.

9. The emergency vehicle battery charging device according to claim 1, wherein said first indicating means includes energized green light means, said second indicating means includes energized red light means, and said green light means and said red light means are on said control housing.

10. A battery charging device for electrically connecting a first pair of battery terminals of a first battery of a first vehicle to a second pair of battery terminals of a second battery of a second vehicle; the first pair of battery terminals including a first positive terminal and a first negative terminal; the second pair of battery terminals including a second positive terminal and a second negative terminal; said battery charging device for allowing the second battery, when the second vehicle is not running, to be charged from the first battery, when the first vehicle is running, and, alternatively, for allowing the first battery, when the first vehicle is not running, to be charged from the second battery, when the second vehicle is running; the first and second vehicles being of types that include engine systems having alternators that generate electrical current at a rated output which is within a range of a first predetermined maximum output current and a second predetermined maximum output current; the second predetermined maximum output current being larger than the first predetermined maximum output current; the engine systems requiring starting currents that are substantially greater than the second predetermined maximum output current; said battery charging device comprising:

a control housing;

a first pair of cables having a first positive cable and a first negative cable;

said first positive cable and said first negative cable extending from said control housing for respectively being rigidly connected to the first positive terminal and the first negative terminal;

a second pair of cables having a second positive cable and a second negative cable;

said second positive cable and said second negative cable extending from said control housing for respectively being temporarily connected to the second positive terminal and the second negative terminal during the charging of one of the first battery and the second battery from the other of the first battery and the second battery;

said control housing including circuit switch means for selectively connecting said first positive cable to said second positive cable;

current limiting means in at least one of said first positive cable and said first negative cable for limiting a charging current through said first pair of said cables, said second pair of said cables, and said control housing to a predetermined maximum charging current;

said predetermined maximum charging current being within a charging range of about one-sixth to about one-fourth of the starting currents;

said control housing including polarity detecting means for detecting a correct polarity, with said second positive cable connected to the second positive terminal and said second negative cable connected to the second negative terminal, and an incorrect polarity, with said second positive cable connected to the second negative terminal and said second negative cable connected to the second positive terminal;

said polarity detecting means including first indicating means for indicating said correct polarity and second indicating means for indicating said incorrect polarity;

said polarity detecting means including a detecting circuit that is electrically connected between said second positive cable and said second negative cable;

said detecting circuit including normally open circuit means;

said normally open circuit means being closed when said circuit switch means is closed to allow said charging current to pass between the first positive terminal and the second positive terminal; and said first pair of said cables, said second pair of said cables, and said control housing being capable of conducting said charging current up to said predetermined maximum charging current from the first pair of battery terminals to the second pair of battery terminals when charging the second battery from the first vehicle and, alternatively, from the second pair of battery terminals to the first pair of battery terminals when charging the first battery from the second vehicle.

11. The battery charging device according to claim 10, wherein said current limiting means in said one of said first positive cable and said first negative cable is adjacent to the first battery.

12. The battery charging device according to claim 10, wherein said predetermined maximum charging current is greater than the first predetermined maximum output current.

13. The battery charging device according to claim 10, wherein said first pair of said cables is at least four times as long as said second pair of said cables.

14. The battery charging device according to claim 13, wherein said control housing includes a central access tube and a first cable storage compartment mounted for relative rotation around said central access tube, said first pair of said cables extends through said central access tube to an interior of said first cable storage compartment, and said first pair of said cables are disposed for being wrapped about said central access tube with only an end of said first pair of said cables extending through an exit opening of said first cable storage compartment toward the first battery when said battery charging device is not being used to charge one of the first and second batteries from the other of the first and second vehicles.

15. The battery charging device according to claim 10, wherein said control housing includes second cable storage means for storage of said second pair of said cables therein when said battery charging device is not being used to charge one of the first and second batteries from the other of the first and second vehicles.

16. The battery charging device according to claim 10, wherein said first indicating means includes an energized green light, said second indicating means includes an energized red light, and said green light and said red light are on said control housing.

17. A battery charging system for selective electrical connection of a first pair of battery terminals of a first battery of a first vehicle to a second pair of battery terminals of a second battery of a second vehicle for the selective charging of one of the first battery and the second battery from the other of the first vehicle and the second vehicle; the first pair of battery terminals including a first positive terminal and a first negative terminal; the second pair of battery terminals including a second positive terminal and a second negative terminal; the first and second vehicles being of types that include engine systems having alternators that generate electrical current at a rated output between 35 and 60 amps; the engine systems requiring starting currents between 200 and 250 amps; said battery charging system comprising:

an emergency charging device;

said emergency charging device having a first pair of cables, a second pair of cables and a control housing therebetween;

said first pair of said cables having a first positive cable and a first negative cable;

said first positive cable and said first negative cable extending from said control housing and being rigidly connected respectively to the first positive terminal and the first negative terminal;

said second pair of said cables having a second positive cable and a second negative cable;

said second positive cable and said second negative cable for respectively extending from said control housing to be temporarily connected to the second positive terminal and the second negative terminal during the charging of one of the first battery and the second battery from the other of the first vehicle and the second vehicle;

said control housing including a charging switch for selectively connecting said first positive cable to said second positive cable;

a current limiting circuit breaker in at least one of said first positive cable and said first negative cable for limiting a charging current through said first pair of said cables, said second pair of said cables, and said control housing to a maximum charging current which is between 40 and 60 amps;

said control housing including polarity detecting means for detecting a correct polarity, with said second positive cable connected to the second positive terminal and said second negative cable connected to the second negative terminal, and an incorrect polarity, with said second positive cable connected to the second negative terminal and said second negative cable connected to the second positive terminal;

said polarity detecting means including an energized green light on said control housing for indicating said correct polarity and an energized red light on said control housing for indicating said incorrect polarity;

said polarity detecting means including a detecting circuit electrically connected between said second positive cable and said second negative cable;

said detecting circuit including a normally open magnetic switch which is closed when said charging switch is closed to allow said charging current to flow between the first positive terminal and the second positive terminal; and said first pair of said cables, said second pair of said cables, and said control housing being capable of conducting said charging current up to said maximum charging current from the first pair of battery terminals to the second pair of battery terminals when charging the second battery from the first vehicle and, alternatively, from the second pair of battery terminals to the first pair of battery terminals when charging the first battery from the second vehicle, whereby said battery charging device allows the second battery of the second vehicle, when the second vehicle is not running, to be charged from the first battery, when the first vehicle is running, and, alternatively, allows the first battery of the first vehicle, when the first vehicle is not running, to be charged from the second battery, when the second vehicle is running.

18. The emergency vehicle battery charging device according to claim 1, wherein said polarity detecting means further includes means for indicating an improper electrical connection between at least one of said cables and a corresponding one of said battery terminals when there is said correct correspondence of said battery terminals of said first and said second batteries and when said first and said second pair of said cables are connected by said circuit switch means.

* * * * *